United States Patent [19]

Kysar

[11] Patent Number: 4,821,496
[45] Date of Patent: Apr. 18, 1989

[54] COTTON HARVESTING APPARATUS

[76] Inventor: Ronald L. Kysar, Box 740, Chino Valley, Ariz. 86323

[21] Appl. No.: 58,385

[22] Filed: Jun. 5, 1987

[51] Int. Cl.⁴ .......................................... A01D 46/08
[52] U.S. Cl. ........................................ 56/28; 56/49; 209/672
[58] Field of Search .................. 56/49, 48, 28, 364; 19/202, 203, 204, 205; 209/672

[56] References Cited

U.S. PATENT DOCUMENTS

| 1,015,110 | 1/1912 | Willis | 209/672 |
| 1,677,838 | 7/1928 | Molin | 209/672 |
| 3,399,518 | 9/1968 | Gray | 56/28 |
| 3,425,097 | 2/1969 | Rood et al. | 19/204 |
| 3,663,142 | 5/1972 | Cafarelli | 209/672 |
| 4,497,088 | 2/1985 | Lehman | 19/203 |

FOREIGN PATENT DOCUMENTS

| 190695 | 6/1967 | U.S.S.R. | 56/28 |
| 393995 | 12/1973 | U.S.S.R. | 56/49 |
| 259527 | 11/1978 | U.S.S.R. | 56/28 |

Primary Examiner—John Weiss
Attorney, Agent, or Firm—Tod R. Nissle

[57] ABSTRACT

Improved cotton harvesting apparatus. The apparatus efficiently separates rocks, dirt and debris from down cotton while minimizing the damage and down time which can result when such debris passes through conventional cotton harvesting machines.

Spaced apart rotating parallel coaxial resilient disks carried in the apparatus capture rocks and debris and throw the debris free of the apparatus while minimizing the damage caused by such debris to other working components of the apparatus.

1 Claim, 1 Drawing Sheet

U.S. Patent
Apr. 18, 1989
4,821,496
FIG-1
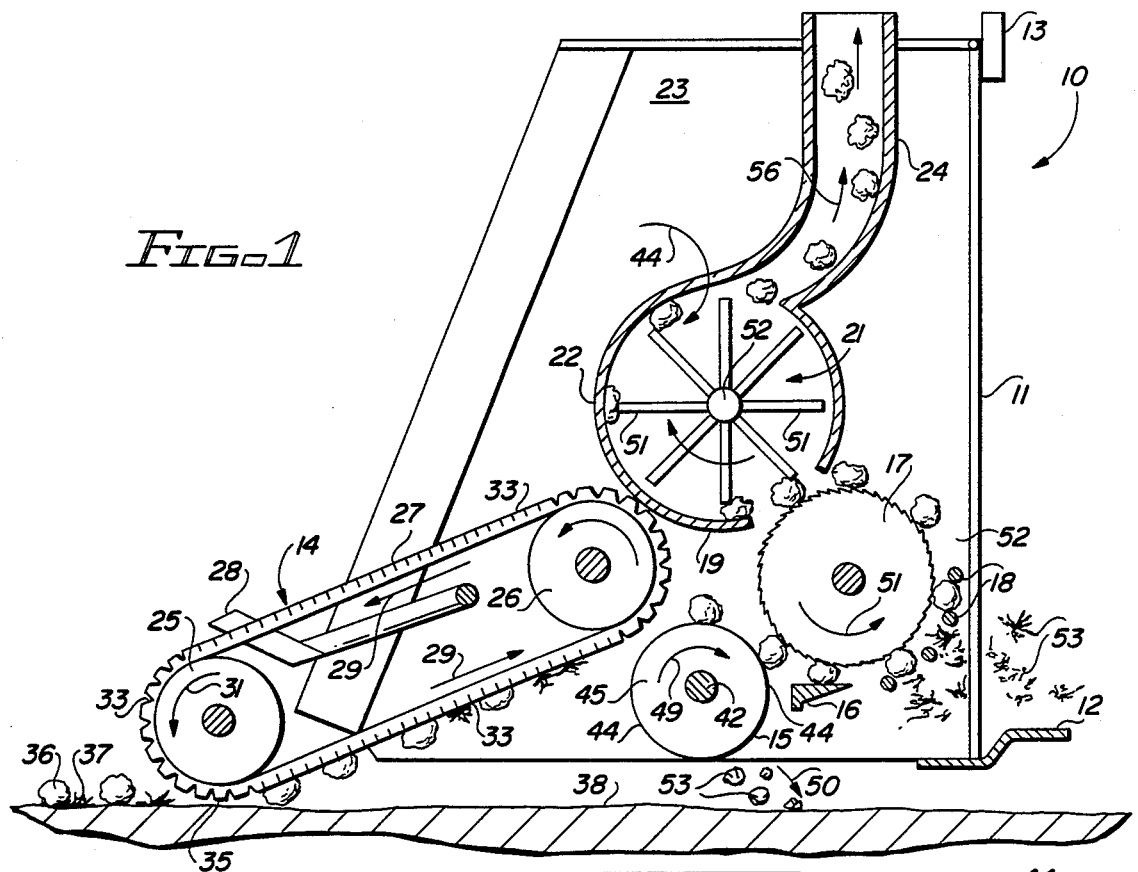
FIG-4
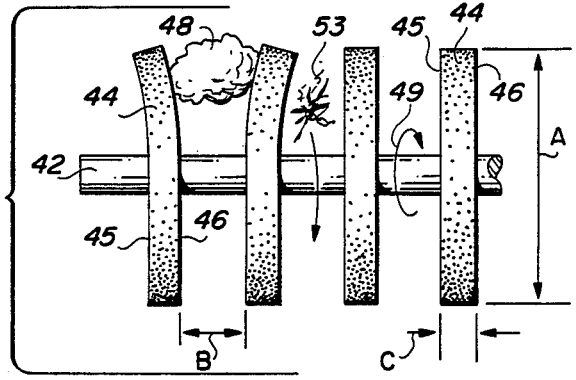
FIG-2
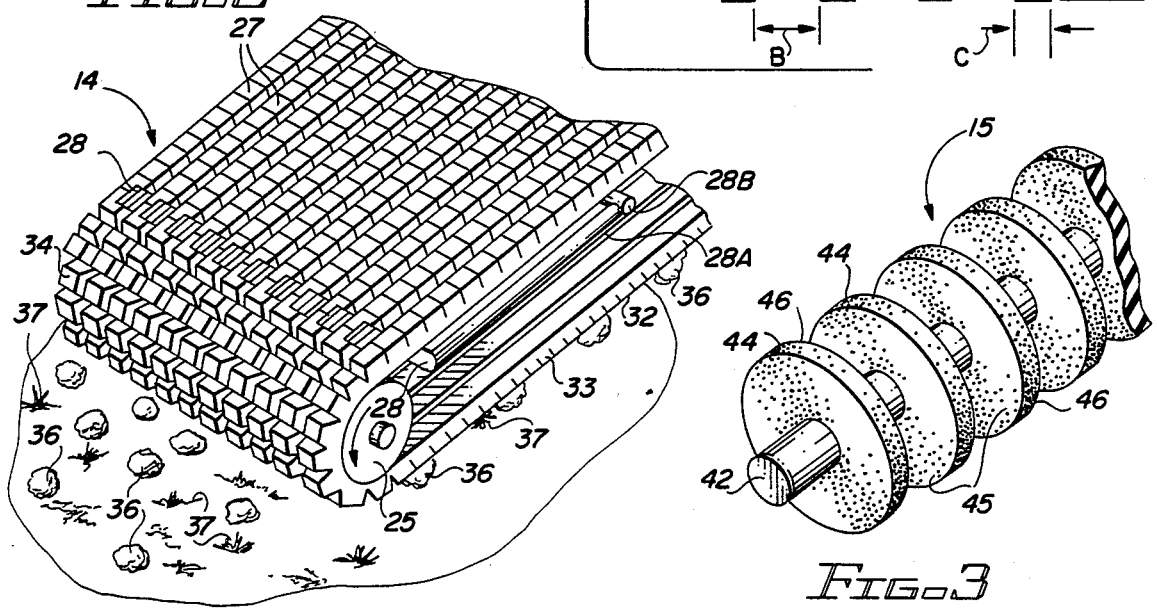
FIG-3

COTTON HARVESTING APPARATUS

This invention relates to cotton harvesting machines.

More particularly, the invention relates to equipment which retrieves "down" cotton from the ground and separates rocks, dirt and debris from the cotton while minimizing the damage or down time which can result when such debris passes through conventional cotton harvesting machines.

Equipment for harvesting "down" cotton, i.e. cotton that has been knocked to the ground during harvesting with conventional mechanical cotton harvesting equipment, is well known in the art. See, for example, U. S. Pat. Nos. 4,390,376 to Rood, Jr. and 4,497,008 to Lehman. A primary objective of the apparatus described in the Lehman patent is the efficient removal of rocks, dirt and debris from down cotton. However, the Lehman apparatus has, in use, important disadvantages. First, rocks or other debris can wedge between the beater drum (reference character 15 in Fig. of the Lehman patent) and saw tooth drum 17, causing beater 15 and drum 17 to stop rotating. Second, even if rocks or debris which pass between beater 15 and drum 17 do not stop these two components from operating, such debris damages the saw teeth on drum 17. Third, in the Lehman apparatus, dirt, rocks and debris tend to be carried over doffer 15 along with the cotton clumps.

Accordingly, it would be highly desirable to provide improved down cotton harvesting equipment which would minimize down time and damage caused by dirt, rocks and debris carried from the ground into the harvesting equipment and which would, when cotton was being removed from the belt carrying cotton clumps up from the ground, readily separate larger rocks and debris from the cotton.

Therefore, it is a principal object of the invention to provide improved equipment for harvesting cotton.

Another object of the invention is to provide improved cotton harvesting equipment of the type including a transfer means which carries cotton clumps from a belt to a saw tooth drum in the equipment, the belt carrying cotton clumps, dirt, and debris upwardly from the ground.

A further object of the invention is to provide improved cotton harvesting apparatus of the type described in which the transfer means effectively separates larger rocks and debris from cotton and minimizes the likelihood that such rocks and debris can wedge between the transfer means and rotating drum and jam the cotton harvesting apparatus.

Still another object of the invention is to provide improved cotton harvesting apparatus of the type described which utilizes the force of gravity and centrifugal force to separate rocks and debris from cotton clumps being carried by the transfer means in the apparatus.

These and other, further and more specific objects and advantages of the invention will be apparent to those skilled in the art from the following detailed description thereof, taken in conjunction with the drawings in which:

FIG. 1 is a side elevation view of cotton harvesting apparatus constructed in accordance with the principles of the invention;

FIG. 2 is a perspective view of the belt means of the apparatus of FIG. 1, the belt means carrying down cotton, rocks, dirt, and debris from the ground into the cotton harvesting apparatus;

FIG. 3 is a perspective view of the disk assembly used in the cotton harvesting apparatus of FIG. 1 to transfer cotton from the belt means to a rotating saw tooth drum; and, FIG. 4 is a side elevation view of the disk assembly of FIG. 3 illustrating the mode of operation thereof.

Briefly, in accordance with my invention, I provide improved cotton harvesting apparatus. The apparatus includes ground engaging frame means; saw tooth drum means mounted on said frame means for rotation about a first axis; doffing means rotatably positioned on said frame means for removing clumps of cotton from the saw teeth of said drum means; means for transferring cleaned clumps of cotton from said doffing means into a cotton removal conduit; belt means mounted on said frame means for carrying cotton clumps and the debris associated therewith upwardly from the ground; and, transfer means mounted on the frame for rotation about a second axis and for carrying cotton clumps from the belt means to the saw tooth drum means. The transfer means includes an axle rotating about the second axis and a plurality of spaced apart resilient disks carried on the axle for rotation therewith each disk having a peripheral generally cylindrical surface. The first and second axis and the belt means are positioned with respect to one another to define a transfer means such that cotton clumps from the belt means are carried cross the fee space to the drum means on the peripheral edges of the disks, the clumps being pressed against the peripheral edges by the force of gravity; dirt and debris from the belt means travel between the disks toward the axle; and, debris and rocks of a selected size wedge between and outwardly displace opposing pairs of disks to be thrown free of the transfer means when the disks rotate toward the ground.

Turning now to the drawings, which depict the presently preferred embodiment and best mode of the invention for the purpose of illustrating the practice thereof and not by way of limitation of the scope of the invention, and in which identical reference characters correspond to like elements throughout the several views, FIG. 1 illustrates cotton harvesting apparatus constructed in accordance with the principles of the invention and generally identified by reference character 10. Apparatus 10 includes an outer housing 11, mounting brackets 12 and 13 for securing the apparatus to the front of a cotton picker or stripper chassis (not shown), a slotted belt pick-up heat 14, resilient disk transfer means 15, a baffle member 16, a saw-tooth gin drum 17, a grid of transverse cleaning rods 18, a doffer drum 21 in a cylindrical housing 22 having open ends through which air 44 is draw into housing 22 and pushed upwardly from housing 22 through conduit 24 in the direction indicated by arrow 56.

As shown in FIGS. 1 and 2, pick-up head 14 comprises two cylindrical drums or pulley systems 25 and 26 comprising what is known in the art as banjo wheels and a plurality of slotted flexible belts 27. Belt guide bars 28 are attached through arms 28A to a cross bar 28B and are incorporated in the apparatus to assure the proper positioning of belts 27 on the forward pulley system 25. Belts 27 are slotted transversely to effect the pick-up action necessary for retrieving down cotton. In the operation of pick-up head 14, slotted belts 27 move in the direction indicated by arrows 29 as the drums or pulley systems 25 and 26 rotate in the direction of arrows 31. In the straight or unflexed portions 32 of belts 27, slots 33 are closed; in the flexed portions 45 of belts 27, slots 33 are open. The forward portion 35 of head 14, specifically forward pulley system 25, and the portions of belts 27, momentarily carried thereon, rest upon the surface of the field being harvested. The drums or pulley systems 25 and 26, freely mounted on their respective axes, are thus caused to rotate in the indicated directions by the forward motion of the apparatus as it is propelled by the picker or stripper chassis' ground speed to which it is mounted by means of brackets 12 and 13. As head 14 thus moves forward, cotton tufts, clumps or balls 36 and debris 37 lying on ground 38 are wedged into the open slots 33. As slots 33 in belts 27 move reward past the point of tangency with drum 25, they are closed as they reach the unflexed region 32 of the belts During the closing of slots 33, the wedged cotton balls and assorted debris become firmly gripped within the closed slots and are carried rearward to drum or pulley system 26, slots 33 are again opened to release the cotton and debris.

Belt guide bars 28 are secured to a structural member or rod 28B carried by housing 11. The individual bars 28 extend upward from frame member or arms 28A, one between each of the juxtaposition belts 27, as shown in FIG. 2, and terminate just above the upper surface of the upper unflexed region of belts 27. In addition to guiding belts 27, the belt guide bars 28 maintain a given limited spacing, such as one eighth of an inch or greater, between the various banjo wheels 25, thus eliminating excessive wear of the banjo wheels.

The resilient disk transfer means 15 includes a plurality of spaced apart, generally parallel resilient disks fixedly attached to axle 42. Each resilient disk includes outer cylindrical edge or surface 44 and parallel opposed circular planar faces 45 and 46. The resilient disks presently comprise five sixteenths inch thick standard two ply conveyor belting made from neoprene or rubber. The diameter of each disk, indicated by arrows A in FIG. 4, is in the range of four to twelve inches, preferably eight inches. The diameter of the resilient disks can be greater than twelve inches, but preferably should not be less than four inches. Disks having a diameter of less than four inches cannot satisfactorily bridge the distance between head 14 and saw-tooth drum 17. The distance, indicated by arrows B in FIG. 4, between an adjacent pair of disks can vary, but is presently 0.25 to 0.50 inch. As noted, the presently preferred thickness, indicated by arrows C in FIG. 4, of the resilient disks is five sixteenth inch. The thickness C of the resilient disks can vary as desired, provided the disks are resilient enough to elastically deform in the manner indicated in FIG. 4 when a rock 48 or other debris of a selected size falls under the force of gravity between an adjacent pair of resilient disks. Axle 42 rotates in the direction indicated by arrow 49 in FIGS. 1 and 4. When axle 42 is rotating, rock 48 is thrown from the resilient disks under the force of gravity and centrifugal force when rock 48 is carried downwardly by the rotation of the resilient disks and axle 42. As illustrated in FIG. 1, clumps of cotton are carried from head 14 to drum 17 by the outer cylindrical surfaces 44 of the resilient disks on transfer means 15. Means 15 minimizes damage to the saw-teeth on drum 17 because dirt, stones, and debris can fall downwardly under the force of gravity between the opposed faces 45 and 46 of adjacent pairs of disks. Further, the resilient nature of the disks permits larger stones and debris to fall between and displace the disks in the manner illustrated for rock 48 in FIG. 4, only to be thrown free from the disks as the disks rotate and downwardly displace the rock 48 or other debris toward the ground 38.

Transfer drum means 15 is positioned just rearward of and below the axis of drum or pulley system 26, with its axis aligned parallel therewith. The outer surfaces 44 of transfer means 15 are positioned in close proximity to the surfaces 44 of the resilient disks. Axle 42 is rotationally coupled to drums or pulley systems 25 and 26 by belts or chains so that as drums or pulley systems 25 and 25 rotate in the direction of the arrows 31, transfer drum 15 is rotated in the direction of arrow 49. In contrast to the transfer drum 15 described in U.S. Pat. No. 4,497,088 to Lehman, means 15 shown in FIGS. 1, 3 and 4 herein does not "beat" against the cotton and debris received from belts 27 in the region of the opening slots 33. This "beating" action of the transfer drum 15 in U.S. Pat. No. 4,497,088 facilitates jamming of stones or debris between the transfer drum 15 and the saw-tooth drum 17.

Saw-tooth drum 17 in FIG. 1 herein is similar in construction to the drum 17 described in U.S. Pat. No. 4,497,088.

Rectangular baffle means 16, preferably of a flexible material, such as rubber, has its longitudinal axis aligned with the axis of drum 17 with its surface tangent with a circle just larger than the diameter of drum 17. It is positioned to form a tapered channel with the outer surface of drum 17. Baffle means 16 functions to set the cotton into and between the saw-teeth on drum 17.

Cotton clumps or balls which pass intermediate baffle means 16 and drum 17 are gripped by the saw-teeth of drum 17 and carried in the direction of arrow 51 toward a grid of transversely positioned cleaning rods 18 which are evenly spaced about the arc of a circle 52 that has a diameter somewhat larger than that of drum 17. Cleaning rods 18 are positioned sufficiently close to the outer surface of drum 17 such that the cotton balls carried by drum 17 are whipped and brushed briskly against rods 18. Twigs, grass, leaf trash, and other debris 53 attached to or extending from the outer surface of the individual cotton balls are broken loose and travel outwardly through the spaces between rods 18.

The apparatus of the invention does not include a second saw-tooth drum comparable to saw-tooth drum 21 in U.S. Pat. No. 4,497,088. When cotton is wet it wraps around and sticks to the second saw-tooth drum 21 in U.S. Pat. No. 4,497,088. The apparatus of the invention avoids this problem.

Elongate planar rectangular doffer panels 51 are fixedly secured to axle 52 in the manner indicated in FIG. 1. The outer ends of panels 51 remove cotton from the saw-teeth of drum 17. The flow of air inward 84 and upward 56 through conduit 24 carries cotton upwardly from doffer 21 in the direction of arrows 56.

Doffer 21 rotates at a peripheral velocity greater than that of drum 17. The ratio of the peripheral velocity of doffer 21 to that of drum 17 is preferably in the order of two-to-one. Because the peripheral velocity of doffer 21 is greater than that of drum 17, the cotton balls that are carried by drum 17 into the confined region of closest proximity between doffer 21 and drum 17 are loosened and removed by the ends of panels 51; the dislodged cotton balls are then moved forward at a velocity greater than the peripheral velocity of drum 17 and are thus dislodged from the forwardly directed saw-teeth of drum 17. Since doffer 21 incorporates in its design the characteristics of a paddle blower, cotton balls dislodged from the saw-teeth are, as earlier described, upwardly carried in the direction of arrow 56.

By eliminating the second saw-tooth drum 21 utilized in the apparatus of U.S. Pat. No. 4,497,088, and by incorporating resilient disk transfer means (reference character 15 in FIGS. 1, 3 and 4 herein), cotton harvesting apparatus is produced which weighs substantially less than the prior art apparatus and which significantly reduces the likelihood that the apparatus will be jammed or that the sawtooth drum will be damaged during operation of the apparatus.

Having described my invention in such terms as to enable those skilled in the art to understand and practice it, and having identified the presently preferred embodiments and best mode thereof, I claim:

1. Apparatus for removing dirt and debris from clumps of cotton, said apparatus including
    (a) ground engaging frame means;
    (b) saw tooth drum means mounted on said frame means for rotation about a first axis;
    (c) doffing means rotatably positioned on said frame means for removing clumps of cotton from the saw teeth of said drum means;
    (d) means for transferring cleaned clumps of cotton from said doffing means into a cotton removal conduit;
    (e) belt means mounted on said frame means for carrying cotton clumps upwardly from the ground, said belt means having an upper end and a lower end;
    (f) transfer means mounted on said frame for rotation about a second axis and for carrying cotton clumps from said belt means to said saw tooth drum means and including
        (i) an axle rotating about said second axis, and
        (ii) a plurality of spaced apart laterally resilient disks carried on said axle for rotation therewith, each disk having a peripheral generally cylindrical outer surface spaced apart from and beneath said upper end of said belt means;
    said first and second axes and said belt means being positioned with respect to one another to define a free space intermediate said belt means and saw tooth drum means substantially spanned by said peripheral generally cylindrical outer surfaces of said transfer means such that
    (g) cotton clumps from said belt means are released onto and carried across said free space to said drum means on said peripheral outer surfaces of said disks, said clumps being pressed against said peripheral outer surfaces by the force of gravity;
    (h) dirt and debris from said belt means travel between said disks toward said axle; and,
    (i) debris and rocks of a selected size wedge between and outwardly displace an opposed pair of said resilient disks laterally away from one another, said debris and rock being thrown free of said disks pair and transfer means when said disk pair rotates toward the ground.

* * * * *